July 13, 1926.
J. T. FAIRHURST
CASTER
Filed Jan. 16, 1924
1,592,349
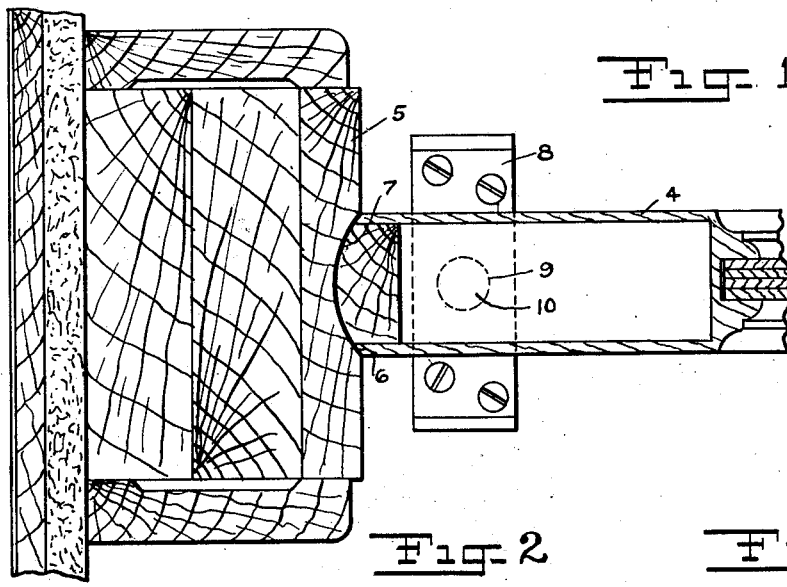
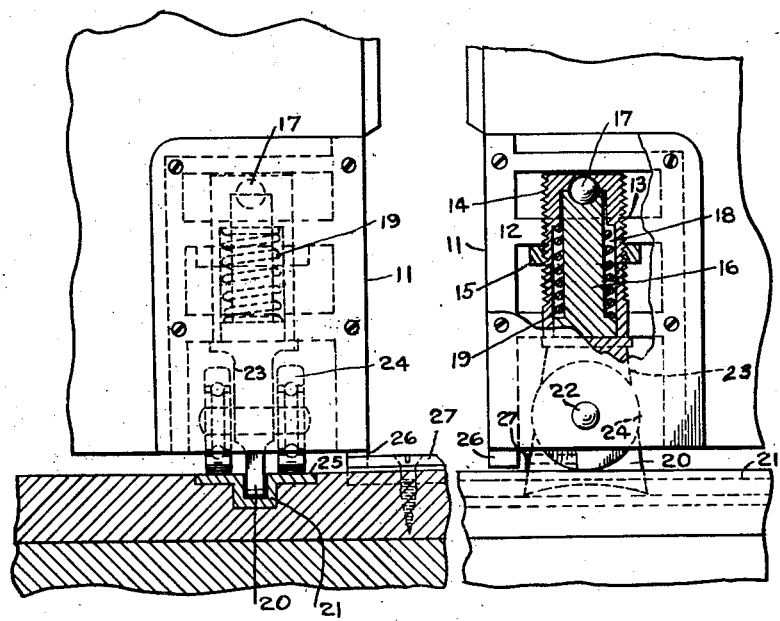
Inventor
John T. Fairhurst.
By his Attorney
Thomas A. Weil.

Patented July 13, 1926.

1,592,349

UNITED STATES PATENT OFFICE.

JOHN T. FAIRHURST, OF ELIZABETH, NEW JERSEY, ASSIGNOR TO THE J. G. WILSON CORPORATION, OF NEW YORK, N. Y.

CASTER.

Application filed January 16, 1924. Serial No. 686,508.

My invention relates to improvements in folding partitions, and more particularly has reference to a roller caster adapted for supporting and guiding the same.

In the accompanying drawings, I have illustrated in Fig. 1 part of a section of a folding partition and part of the jamb portion in cross section, the caster being adapted to be mounted in the lower end of the partition. Fig. 2 illustrates an application of the caster partly in dotted outline in side elevation showing an embodiment of my invention, and Fig. 3 is a similar view showing a caster of an adjacent section with the guide at right angles to the guide shown in Fig. 2, parts of the caster being broken away and in longitudinal section.

4 indicates the door or section of the folding partition, and 5 the jamb with a curved out portion 6 into which the curved edge 7 of the end section fits. 8 is a suitable plate provided with a hole 9 through which the pin 10 projecting from the section 4 enters serving as a pivotal support for the end section or door. In the bottom of each door or section and at the adjacent side thereof is mortised a caster 11 shown to advantage in Figs. 2 and 3. This caster consists of a frame or housing 12 having a threaded portion 13 adapted to receive the externally threaded socket member 14 which is provided with a nut 15 for adjusting the projection of the same downwardly. 16 indicates the spindle of the caster the top of which is recessed, and likewise the socket 14 to receive the ball bearing 17. A suitable space 18 is also provided between the socket 14 and spindle 16 for the coiled spring 19 and the lower end of the spindle 16 terminates in the plow portion 20 adapted to traverse the channel 21. A pin 22 through the stem 23 of the plow portion 20 serves to carry the wheels or rollers 24 adapted to ride upon the tracks such as 25. When the caster has been applied to the door or section it is adjusted to the highest point of the floor, assuming that there is some unevenness so that in passing over any of the lower points, the compresson spring 19 serves to sufficiently project the wheels of the caster to compensate for the unevenness, thus providing a roller bearing adapted to at all times snugly engage the track or channel and avoid rattling and loose fitting noises, while at the same time the caster serves as a pivot for swinging the door or section during the folding operation. 26 indicates a projection from the base of the frame or housing 12 adapted to engage the stop 27 adjacent the track or guide for controlling the movement of the section when the door is in folded position. The engagement of the projection 26 with the stop 27 will prevent the door from being moved along the channel 21 when the door is in its folded position.

Of course it will be understood that various modifications may be made in the construction and arrangement of parts without departing from the spirit of the invention as claimed.

I claim:—

1. A caster comprising a suitable housing, a socket member adjustably mounted there in, a caster spindle slidably mounted in said socket member, the socket member being rotatable on said spindle, means carried by the spindle for holding the spindle from rotation, means tending yieldingly to force the caster spindle outwardly of said socket member, and a caster wheel carried by said spindle.

2. A caster for sliding doors comprising a housing, a hollow cylindrical socket member adjustably threaded into the housing, means for securing the socket member in adjusted position in the housing, a caster spindle slidably and rotatably mounted in the housing, a bearing ball interposed between the inner end of the spindle and the end wall of the housing, a coiled spring surrounding the spindle and interposed between the same and the socket member and tending yieldingly to force the spindle outwardly of the socket member, a guide portion projecting from the end of the spindle outside of the housing, and a caster wheel rotatably mounted upon each of the opposite sides of said guide portion.

In testimony whereof I hereunto affix my signature.

JOHN T. FAIRHURST.